(12) United States Patent
Choi

(10) Patent No.: US 9,522,665 B2
(45) Date of Patent: Dec. 20, 2016

(54) ELECTRONIC BRAKE SYSTEM AND CONTROL METHOD THEREOF

(71) Applicant: MANDO CORPORATION, Pyeongtaek-si (KR)

(72) Inventor: Kyu-Woong Choi, Yongin-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 44 days.

(21) Appl. No.: 14/305,970

(22) Filed: Jun. 16, 2014

(65) Prior Publication Data
US 2015/0028664 A1   Jan. 29, 2015

(30) Foreign Application Priority Data

Jul. 25, 2013  (KR) .................. 10-2013-0087719

(51) Int. Cl.
*B60T 13/74*  (2006.01)
*B60T 7/04*   (2006.01)
*B60T 8/40*   (2006.01)

(52) U.S. Cl.
CPC ............ *B60T 13/745* (2013.01); *B60T 8/4077* (2013.01); *B60T 7/042* (2013.01)

(58) Field of Classification Search
CPC ...... B60T 13/74; B60T 13/745; B60T 13/588; B60T 13/142; B60T 7/042; B60T 7/04; B60T 1/10

(Continued)

(56) References Cited

U.S. PATENT DOCUMENTS

| 2002/0158510 | A1 | 10/2002 | Kobayashi et al. |
| 2008/0231109 | A1* | 9/2008 | Yamada ............... B60T 8/3265 303/20 |

(Continued)

FOREIGN PATENT DOCUMENTS

| CN | 101254784 | 9/2008 |
| CN | 101817341 | 9/2010 |

(Continued)

OTHER PUBLICATIONS

Office Action dated Jun. 27, 2014 for corresponding Korean Patent Application No. 10-2013-0087719.

(Continued)

*Primary Examiner* — Robert A Siconolfi
*Assistant Examiner* — San Aung
(74) *Attorney, Agent, or Firm* — Ladas & Parry, LLP

(57) ABSTRACT

Disclosed are an electronic brake system and a control method thereof. The electronic brake system includes a master cylinder including a piston, an output rod contacting the piston, an input rod configured to be moved forward by a driver's manipulation of a brake pedal and arranged coaxially to the master cylinder and spaced a predetermined isolation gap apart from the output rod, an electrically-driven booster including a motor, a ball screw to move the output rod, and a motion converting unit to move the ball screw forward and backward by converting rotational movement of the motor into linear movement, and an electronic control unit (ECU) to control operation of the motor based on the size of the isolation gap. When the ball screw is moved backward in an ABS mode, the ECU stops backward-movement of the ball screw before the output rod collides with the input rod.

11 Claims, 5 Drawing Sheets

(58) Field of Classification Search
USPC .......... 303/3, 114.1; 188/180, 106 R; 701/70
See application file for complete search history.

(56) References Cited

U.S. PATENT DOCUMENTS

| | | | | |
|---|---|---|---|---|
| 2009/0115242 | A1* | 5/2009 | Ohtani | B60T 7/042 |
| | | | | 303/3 |
| 2011/0048874 | A1* | 3/2011 | Vollert | B60T 13/745 |
| | | | | 188/152 |
| 2011/0248557 | A1* | 10/2011 | Overzier | B60T 1/10 |
| | | | | 303/3 |
| 2012/0073286 | A1* | 3/2012 | Takayama | B60T 13/745 |
| | | | | 60/538 |
| 2012/0144823 | A1* | 6/2012 | Usui | B60T 13/745 |
| | | | | 60/545 |
| 2013/0197771 | A1* | 8/2013 | Takeda | B60T 13/745 |
| | | | | 701/70 |

FOREIGN PATENT DOCUMENTS

| | | |
|---|---|---|
| CN | 102556035 | 2/2016 |
| JP | 2003-312463 | 11/2003 |
| JP | 2007-296963 | 11/2007 |
| JP | 2008-30599 | 2/2008 |
| JP | 2008-239142 | 10/2008 |
| KR | 10-2005-0100238 | 10/2005 |
| KR | 10-2012-0064628 | 6/2012 |

OTHER PUBLICATIONS

Office Action dated May 24, 2016 for Chinese Patent Application No. 201410273128.5.

* cited by examiner (a)

(b)

ELECTRONIC BRAKE SYSTEM AND CONTROL METHOD THEREOF

CROSS-REFERENCE TO RELATED APPLICATION

This application claims the benefit of Korean Patent Application No. 10-2013-0087719, filed on Jul. 25, 2013 in the Korean Intellectual Property Office, the disclosure of which is incorporated in its entirety herein by reference.

BACKGROUND

1. Field

Embodiments of the present invention relate to an electronic brake system and a control method thereof, and more particularly to, an electronic brake system and a control method thereof capable of adjusting pressure of a master cylinder using an electrically-driven booster.

2. Description of the Related Art

Typically, in an electronic brake system including an electrically-driven booster, when a driver presses on a brake pedal, a pedal force sensor detects pedal force of the driver and an electronic control unit (ECU) drives a motor of the electrically-driven booster based on the detection result of the pedal force sensor to deliver multiplied force to a master cylinder. The master cylinder transfers hydraulic pressure to wheel brakes based on the multiplied force delivered from the electrically-driven booster.

Then, an electronic stability controller (ESC) adjusts the hydraulic force transferred to the front and rear wheel brakes according to a braking mode to achieve suitable braking operation. In other words, the ESC allows brake oil to be supplied to the respective wheel brakes in a normal operation mode. However, in an anti-lock brake system (ABS) mode, i.e., when at least one of the wheels undergoes a locking phenomenon, the ESC allows ABS braking operation to be performed by closing some brake oil passages.

In such an electronic brake system including the electrically-driven booster, when a driver applies pressure to a brake pedal by pressing on the same, a motor provided in the electrically-driven booster rotates a ball screw in one direction to move the ball screw forward. The ball screw is configured to move forward and backward through conversion of rotational movement of the motor into linear movement. The ball screw causes an output rod connected to a piston of a master cylinder to be moved forward, thereby moving the piston forward. As the piston is moved forward, internal pressure of the master cylinder is increased, and the increased pressure is transferred to wheel brakes.

When the pressure applied to the brake pedal is released, the motor rotates the ball screw in a reverse direction to move the ball screw backward. Accordingly, the piston of the master cylinder is moved backward, and internal pressure of the master cylinder is decreased.

However, in an ABS mode, the brake oil in the master cylinder may fluctuate and thus internal pressure of the master cylinder may become irregular because of the brake oil returned from the wheel cylinder to the master cylinder. In such a case, if the pressure of the master cylinder is greater than reference pressure, the ball screw of the electrically-driven booster is moved backward to decrease the pressure of the master cylinder. If the pressure of the master cylinder is less than the reference pressure, the ball screw of the electrically-driven booster is moved forward to increase the pressure of the master cylinder.

In general, an isolation gap is formed between an output rod connected to the piston of the master cylinder and an input rod connected to the brake pedal. In abnormal operation of the electronic brake system, the input rod moves a distance corresponding to the isolation gap between the input rod and the output rod, and then physically contacts the output rod, thereby directly transferring pedal force to the master cylinder.

However, when the pressure of the master cylinder is greater than the reference pressure in an ABS mode, and if the ball screw of the electrically-driven booster is moved backward to decrease the pressure of the master cylinder, the output rod contacting the piston of the master cylinder is also moved backward together as the ball screw is moved backward.

At this time, because the driver keeps pressing on the brake pedal and thus the input rod connected to the brake pedal is in a forward-shifted position, the output rod may move a distance beyond the isolation gap and may collide with the input rod, which results in a kick-back phenomenon such that a physical shock is transferred to the brake pedal connected to the input rod due to collision with the output rod. Such a kick-back phenomenon may cause a driver to experience a pulsation in the brake pedal, thereby giving the driver an unpleasant feeling.

SUMMARY

It is an aspect of the present invention to provide an electronic brake system and a control method thereof capable of preventing a pulsation in a brake pedal due to a kick-back phenomenon in an ABS mode.

Additional aspects of the invention will be set forth in part in the description which follows and, in part, will be obvious from the description, or may be learned by practice of the invention.

In accordance with one aspect of the present invention, an electronic brake system comprises: a master cylinder including a piston to generate hydraulic pressure by applying pressure to brake oil; an output rod configured to contact the piston; an input rod configured to be moved forward by a driver's manipulation of a brake pedal, and arranged coaxially to the master cylinder and spaced a predetermined isolation gap apart from the output rod contacting the piston of the master cylinder; an electrically-driven booster including a motor, a ball screw to move the output rod, and a motion converting unit to move the ball screw forward and backward by converting rotational movement of the motor into linear movement of the ball screw; and an electronic control unit to control operation of the motor based on the size of the isolation gap between the input rod and the output rod. When the ball screw of the electrically-driven booster is moved backward in an anti-lock brake system (ABS) mode, the electronic control unit stops backward-movement of the ball screw before the output rod collides with the input rod.

The electronic brake system may further include a pressure sensor to sense pressure of the master cylinder, and if the pressure of the master cylinder sensed by the pressure sensor is greater than reference pressure in an ABS mode, the electronic control unit may drive the motor to move the ball screw backward to decrease the pressure of the master cylinder.

The electronic brake system may further include: a pedal stroke sensor to sense a pedal stroke of the brake pedal; and a motor position sensor to sense an absolute angle of the motor, and the electronic control unit may determine a shifted position of the input rod based on the pedal stroke sensed by the pedal stroke sensor, may determine a shifted position of the output rod based on the absolute angle of the motor sensed by the motor position sensor, and may estimate the size of the isolation gap based on the determined shifted position of the input rod and the determined shifted position of the output rod.

The electronic brake system may further include a sensing unit to sense the size of the isolation gap, and the electronic control unit may determine the size of the isolation gap through the sensing unit.

In accordance with another aspect of the present invention, an electronic brake system comprises: a master cylinder including a piston to generate hydraulic pressure by applying pressure to brake oil; an input rod configured to be moved forward by a driver's manipulation of a brake pedal, and arranged coaxially to the master cylinder and spaced a predetermined isolation gap apart from the piston of the master cylinder; an electrically-driven booster including a motor, a ball screw to move the piston, and a motion converting unit to move the ball screw forward and backward by converting rotational movement of the motor into linear movement of the ball screw; and an electronic control unit to control operation of the motor based on the size of the isolation gap between the input rod and the piston. When the ball screw of the electrically-driven booster is moved backward in an ABS mode, the electronic control unit stops backward-movement of the ball screw before the piston collides with the input rod.

The electronic brake system may further include: a pedal stroke sensor to sense a pedal stroke of the brake pedal; and a motor position sensor to sense an absolute angle of the motor, and the electronic control unit may determine a shifted position of the input rod based on the pedal stroke sensed by the pedal stroke sensor, may determine a shifted position of the piston based on the absolute angle of the motor sensed by the motor position sensor, and may estimate the size of the isolation gap based on the determined shifted position of the input rod and the determined shifted position of the piston.

The electronic brake system may further include a sensing unit to sense the size of the isolation gap, and the electronic control unit may determine the size of the isolation gap through the sensing unit.

In accordance with a further aspect of the present invention, a control method of an electronic brake system including a master cylinder including a piston to generate hydraulic pressure by applying pressure to brake oil, an output rod configured to contact the piston, an input rod configured to be moved forward by a driver's manipulation of a brake pedal and arranged coaxially to the master cylinder and spaced a predetermined isolation gap apart from the output rod contacting the piston of the master cylinder, and an electrically-driven booster including a motor, a ball screw to move the output rod, and a motion converting unit to move the ball screw forward and backward by converting rotational movement of the motor into linear movement of the ball screw, comprises: determining whether there is a need to move the ball screw of the electrically-driven booster backward in an ABS mode; upon determining that there is a need to move the ball screw of the electrically-driven booster backward, driving the motor so that the ball screw of the electrically-driven booster is moved backward; and controlling operation of the motor based on the size of the isolation gap between the input rod and the output rod to stop backward-movement of the ball screw before the output rod collides with the input rod.

The control method may further include: sensing pressure of the master cylinder through a pressure sensor configured to sense pressure of the master cylinder in an ABS mode; determining whether the sensed pressure of the master cylinder is greater than reference pressure; and upon determining that the sensed pressure of the master cylinder is greater than the reference pressure, driving the motor to move the ball screw backward to decrease the pressure of the master cylinder.

The control method may further include: determining a shifted position of the input rod based on a pedal stroke sensed by a pedal stroke sensor configured to sense a pedal stroke of the brake pedal; determining a shifted position of the output rod based on an absolute angle of the motor sensed by a motor position sensor configured to sense an absolute angle of the motor; and estimating the size of the isolation gap based on the determined shifted position of the input rod and the determined shifted position of the output rod.

The control method may further include determining the size of the isolation gap through a sensing unit configured to sense the size of the isolation gap.

As is apparent from the above description, in order to prevent the output rod from colliding with the input rod due to backward-movement of the ball screw of the electrically-driven booster in an ABS mode, the backward-movement of the ball screw is stopped before the output rod collides with the input rod. Accordingly, a kick-back phenomenon in that a shock is transferred to the brake pedal by collision of the output rod with the input rod is prevented, thereby improving ride comfort and driving stability.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
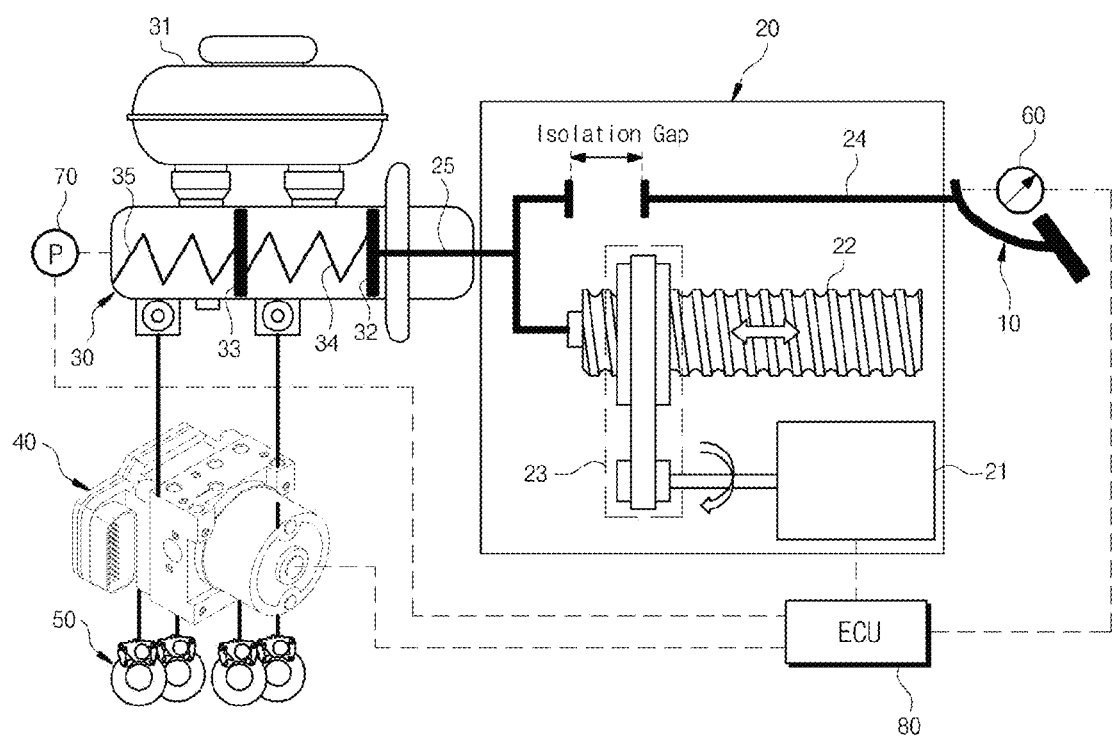
FIG. 1 is a conceptual view to explain constitution of an electronic brake system according to an exemplary embodiment of the present invention.

Reference will now be made in detail to the preferred embodiments of the present invention, examples of which are illustrated in the accompanying drawings. The preferred embodiments described in the specification and shown in the drawings are illustrative only and are not intended to represent all aspects of the invention, such that various equivalents and modifications can be made without departing from the spirit of the invention. In the following description of the present invention, a detailed description of known functions and configurations incorporated herein will be omitted when it may make the subject matter of the present invention rather unclear. In the drawings, the widths, the lengths, the thicknesses, etc. of elements may be exaggerated for convenience of description. Further, in the drawings, the same or similar elements are denoted by the same reference numerals even though they are depicted in different drawings.

Figure 2:
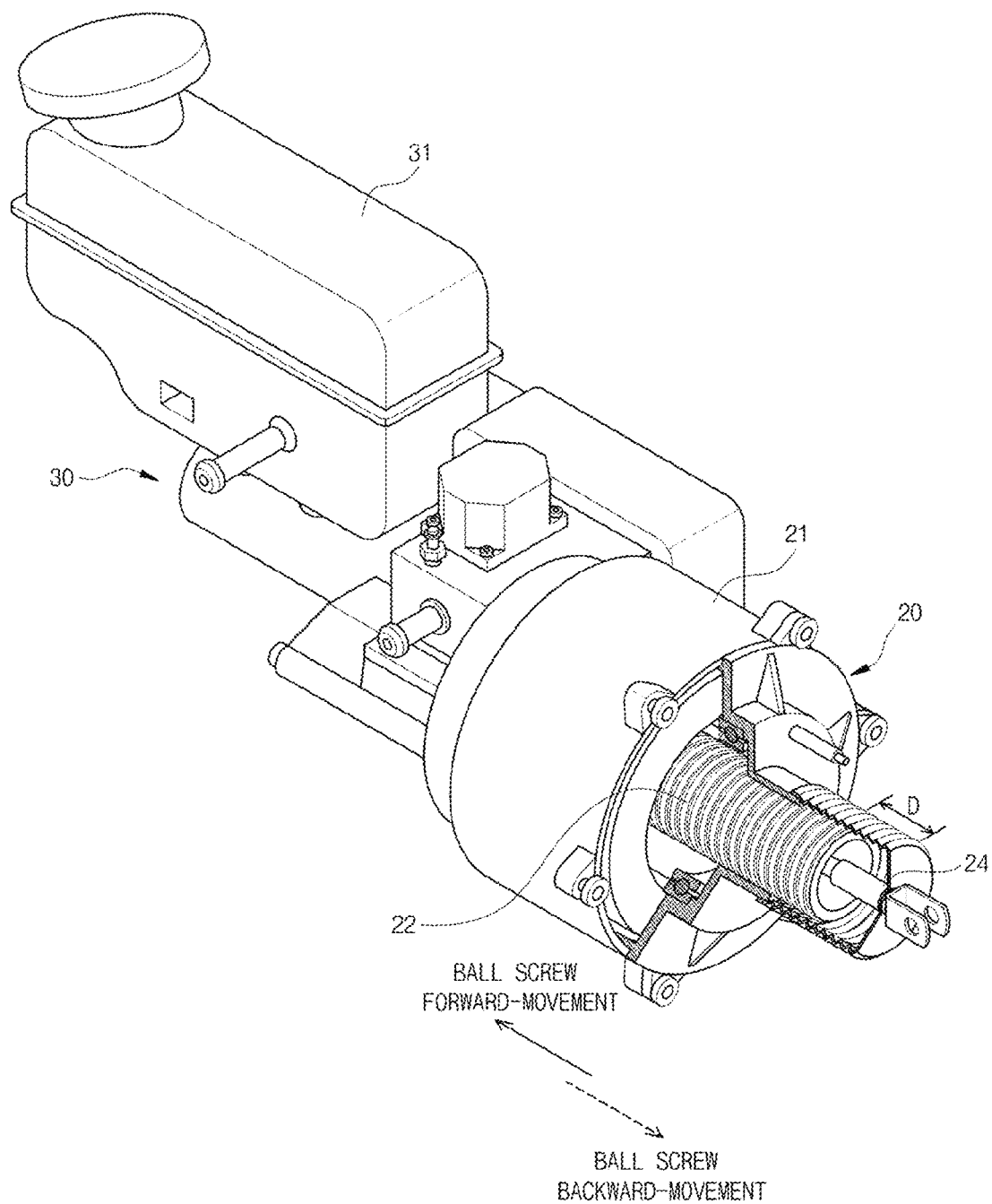
FIG. 2 is a perspective view schematically illustrating the electronic brake system according to an exemplary embodiment of the present invention.

FIG. 1 is a conceptual view to explain constitution of an electronic brake system according to an exemplary embodiment of the present invention, and FIG. 2 is a perspective view schematically illustrating the electronic brake system according to an exemplary embodiment of the present invention.

Referring to FIGS. 1 and 2, an electronic brake system comprises a brake pedal 10, an electrically-driven booster 20, a master cylinder 30, an electronic stability controller (ESC) 40, wheel brakes 50, a pedal stroke sensor 60, a pressure sensor 70 and an electronic control unit (ECU) 80.

The electrically-driven booster 20 acts to transfer multiplied force with respect to a pedal stroke of a driver to the master cylinder 30 using a motor. The electrically-driven booster 20 includes a motor 21, a ball screw 22 and a motion converting unit 23.

The motor 21 is configured to be selectively rotated forward in one direction or rotated backward in a reverse direction. The ball screw 22 is configured to be moved linearly forward and backward. The motion converting unit 23 acts to convert rotational movement of the motor 21 into linear movement of the ball screw 22. One end of the motion converting unit 23 may be connected to a rotating shaft of the motor 21, and the other end thereof may be configured with a belt transmission connected to the ball screw 22.

The electrically-driven booster 20 includes an input rod 24 and an output rod 25.

The input rod 24 is connected to the brake pedal 10. Instead of being directly connected to the brake pedal 10, the input rod 24 may be indirectly connected to the brake pedal 10 through a push rod connected to the brake pedal 10.

One end of the output rod 25 is connected to a first piston 32 provided in the master cylinder 30, which will be described later, and the other end thereof is connected to the ball screw 22. As the ball screw 22 is moved forward, the output rod 25 is moved forward together with the ball screw 22 to move the first piston 32 of the master cylinder 30 forward, thereby increasing pressure of the master cylinder 30. As the ball screw 22 is moved backward, the output rod 25 is moved backward together with the ball screw 22 to move the first piston 32 of the master cylinder 30 backward, thereby decreasing pressure of the master cylinder 30.

An isolation gap is formed between the input rod 24 and the output rod 25. When a driver presses on the brake pedal 10 heavily in abnormal operation of the electronic brake system, the input rod 24 moves a distance corresponding to the isolation gap between the input rod 24 and the output rod 25, and then physically contacts the output rod 25, thereby directly causing the piston of the master cylinder 30 to be moved forward.

The master cylinder 30 acts to transfer hydraulic pressure to the wheel brakes 50 based on the multiplied force transmitted from the electrically-driven booster 20. Such action uses brake oil stored in a reservoir 31. The hydraulic pressure transferred from the master cylinder 30 means brake oil pressure generated from the master cylinder 30 toward the wheel brakes 50 to create friction brake force required at the respective wheel brakes 50.

The master cylinder 30 includes a first piston 32, a second piston 33, a first spring 34 and a second spring 35 to form two hydraulic pressure circuits.

The purpose of forming two hydraulic pressure circuits in the master cylinder 30 is to ensure safety in case of breakdown. For example, one of the two hydraulic pressure circuits is connected to a right front wheel and a left rear wheel, and the other circuit is connected to a left front wheel and a right rear wheel. Alternatively, one of the two hydraulic pressure circuits is connected to two front wheels, and the other circuit is connected to two rear wheels. As such, since the two hydraulic pressure circuits are constituted independently from each other, the braking operation of a vehicle is achieved even when one of the circuits breaks down.

The first piston 32 of the master cylinder 30 compresses the first spring 34 and subsequently, the second piston 33 compresses the second spring 35, thereby compressing the brake oil in the master cylinder 30, resulting in generation of hydraulic brake pressure.

The ESC 40 acts to achieve suitable braking operation by adjusting hydraulic pressure transmitted to the front and rear wheel brakes 50 according to a braking mode. Specifically, the ESC 40 allows brake oil to be delivered to the respective wheel brakes 50 in a normal operation mode, and allows an anti-lock brake system (ABS) braking operation to be performed by closing some brake oil passages in an ABS mode, i.e., when at least one of the wheels undergoes a locking phenomenon.

The pedal stroke sensor 60 is provided at the brake pedal 10 to sense a pedal stroke of the brake pedal 10.

The pressure sensor 70 acts to sense internal pressure of the master cylinder 30.

When a driver presses on the brake pedal, the ECU 80 detects a pedal stroke through the pedal stroke sensor 60 and rotates the motor 21 in one direction to generate a target brake pressure corresponding to the detected pedal stroke, thereby moving the ball screw 22 forward through the motion converting unit 23. Accordingly, the ball screw 22 moves the output rod 25 forward and the forward-moved output rod 25 applies pressure to the first piston 32 contacting the output rod 25. The pressurized first piston 32 compresses the first spring 34, and the second piston 33 compresses the second spring 35. Thereby, the brake oil in the master cylinder 30 is compressed and thus the pressure of the master cylinder 30 is increased.

When a driver takes a foot off the brake pedal to release the pressure applied to the brake pedal, the ECU 80 rotates the motor 21 in a reverse direction to move the ball screw 22 backward through the motion converting unit 23. Accordingly, as the ball screw 22 is moved backward, the output rod 25 is also moved backward together, thereby decreasing the pressure of the master cylinder 30.

In an ABS mode, if the pressure of the master cylinder 30 is greater than reference pressure, the ECU 80 rotates the motor 21 of the electrically-driven booster 20 in one direction to move the ball screw 22 backward in order to move the pistons 32 and 33 of the master cylinder 30 backward, thereby decreasing the pressure of the master cylinder 30. If the pressure of the master cylinder 30 is less than the reference pressure, the ECU 80 rotates the motor 21 of the electrically-driven booster 20 in a reverse direction to move the ball screw 22 forward in order to move the pistons 32 and 33 of the master cylinder 30 forward, thereby increasing the pressure of the master cylinder 30 (refer to FIG. 3a).

Figure 3:
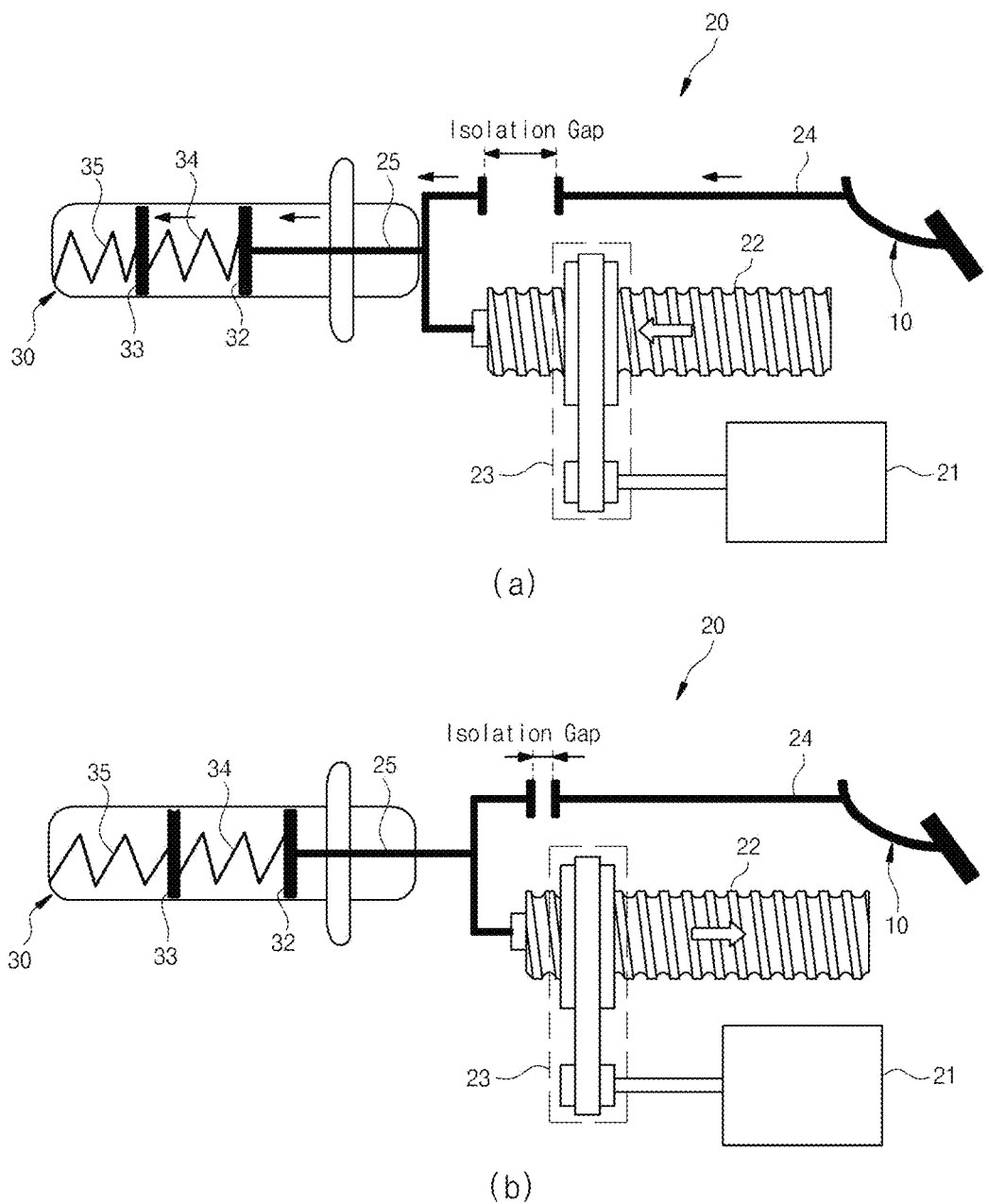
FIG. 3 is a view to explain operation of an electrically-driven booster in an ABS mode of the electronic brake system according to an exemplary embodiment of the present invention.

In addition, in the case of moving the ball screw 22 of the electrically-driven booster 20 backward to decrease the pressure of the master cylinder 30 because the pressure of the master cylinder 30 is greater than the reference pressure in an ABS mode, the ECU 80 controls the operation of the motor 21 based on the size of the isolation gap so as to stop the rearward-movement of the ball screw 22 before the output rod 25 moving backward together with the ball screw 22 moves a distance beyond the isolation gap and collides with the input rod 24 (refer to FIG. 3b). Accordingly, during the ABS mode, the output rod 25 is prevented from colliding with the input rod 24 when the ball screw 22 is moved backward, which prevents generation of a kick-back phenomenon in that a physical shock is transferred to the brake pedal. As a result, ride comfort and driving stability may be improved.

Figure 4:
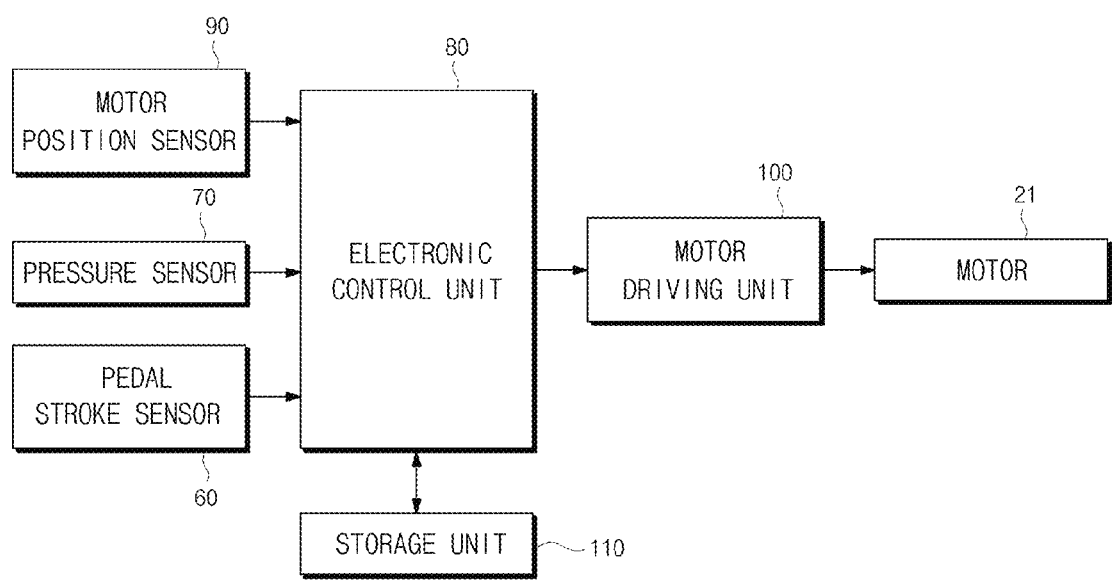
FIG. 4 is a control block diagram of the electronic brake system according to an exemplary embodiment of the present invention.

FIG. 4 is a control block diagram of the electronic brake system according to an exemplary embodiment of the present invention.

Referring to FIG. 4, the electronic brake system may include a pedal stroke sensor 60, a pressure sensor 70, a motor position sensor 90, a motor driving unit 100, a motor 21, a storage unit 110 and an electronic control unit (ECU) 80.

The motor position sensor 90 is mounted to the motor 21, and acts to sense a position of the motor 21, i.e., at least one of an absolute angle and a relative angle of the motor 21 according to rotation of the motor 21 and to transmit the sensed output to the ECU 80. To this end, the motor position sensor 90 may include at least one of a relative angle sensor to sense a relative rotation angle of the motor 21 and an absolute angle sensor to sense an absolute rotation angle of the motor 21.

The motor driving unit 100 is configured to drive the motor 21 according to a motor control signal that is transmitted from the ECU 80.

The storage unit 110 is configured to store information about shifted positions of the input rod respectively corresponding to pedal strokes and forward-shifted or backward-shifted positions of the output rod respectively corresponding to absolute angles (or relative angles) of the motor according to rotation of the motor.

The ECU 80 is configured to control overall operation of the electronic brake system. Specifically, the ECU 80 receives information about a pedal stroke from the pedal stroke sensor 60, a pressure of the master cylinder 30 from the pressure sensor 70, and an absolute angle of the motor 21 from the motor position sensor 90. Based on the information about the pedal stroke, the absolute angle of the motor and pressure of the master cylinder, the ECU 80 controls the operation of the motor 21 through the motor driving unit 100 to move the ball screw forward or backward.

In addition, in the case of moving the ball screw 22 of the electrically-driven booster 20 backward to decrease the pressure of the master cylinder 30 because the pressure of the master cylinder 30 is greater than the reference pressure in an ABS mode, the ECU 80 estimates the size of the isolation gap based on the shifted position of the input rod corresponding to the pedal stroke of the brake pedal 10 sensed by the pedal stroke sensor 60 and the backward-shifted position of the output rod corresponding to the absolute angle of the motor 21 sensed by the motor position sensor 90, and stops the rotation of the motor 21 before the estimated value of the isolation gap reaches 0, thereby stopping the rearward-movement of the ball screw 22 before the output rod 25 moving backward together with the ball screw 22 moves a distance beyond the isolation gap and collides with the input rod 24.

Figure 5:
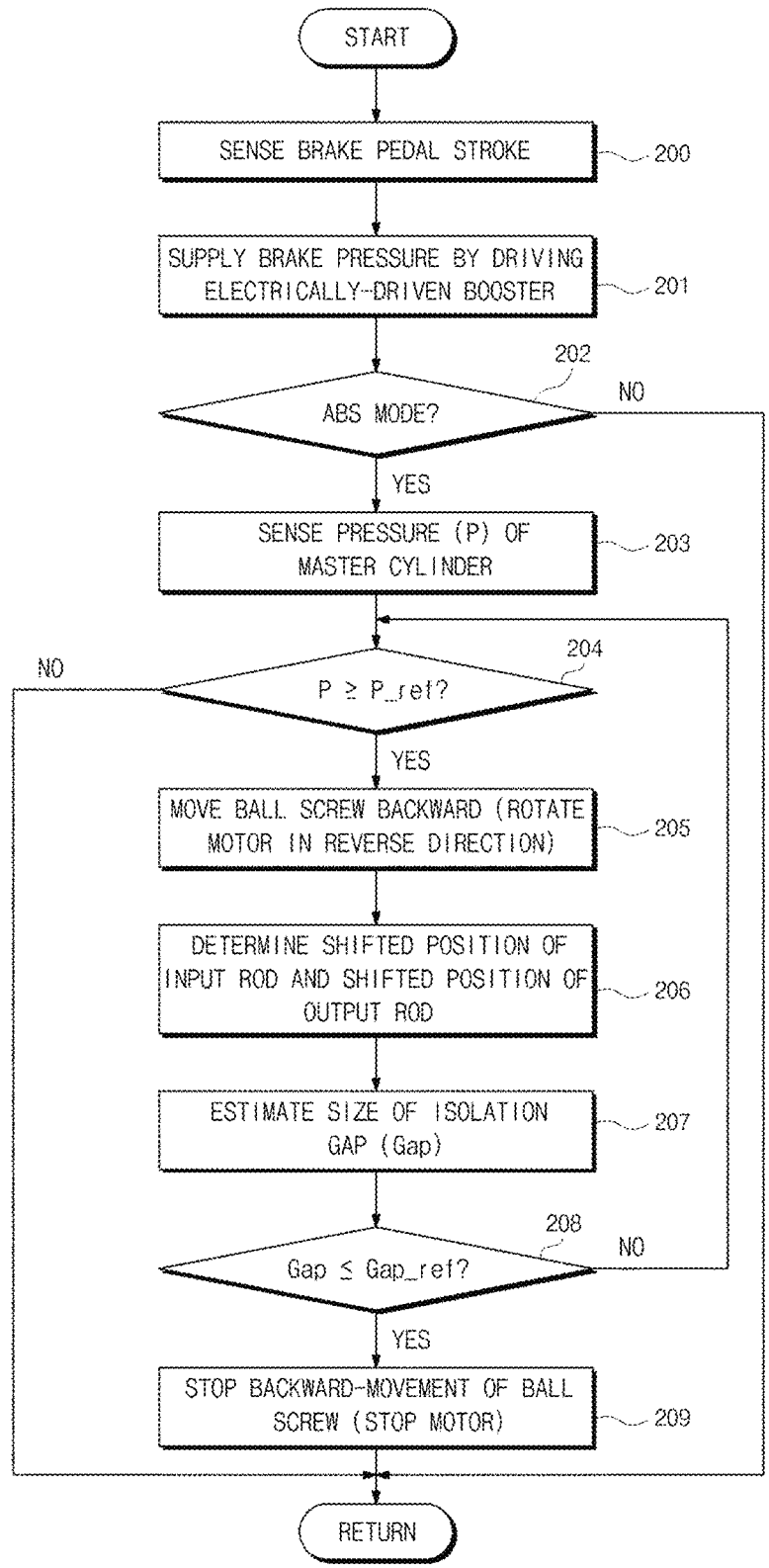
FIG. 5 is a control flowchart illustrating a control method of the electronic brake system according to an exemplary embodiment of the present invention.

FIG. 5 is a control flowchart illustrating a control method of the electronic brake system according to an exemplary embodiment of the present invention.

Referring to FIG. 5, the ECU 80 senses a pedal stroke of the brake pedal 10 at operation 200.

After sensing the pedal stroke of the brake pedal 10, the ECU 80 drives the electrically-driven booster 20 to generate hydraulic brake pressure at the master cylinder 30, and supplies the generated brake pressure to the respective wheel brakes 50 at operation 201.

After supplying the brake pressure by driving the electrically-driven booster 20, the ECU 80 determines whether an ABS mode is activated or not at operation 202.

If it is determined at operation 202 that the ABS mode is activated, the ECU 80 senses a pressure of the master cylinder 30 through the pressure sensor 70 at operation 203.

After sensing the pressure of the master cylinder 30, the ECU 80 determines whether the sensed pressure P of the master cylinder 30 is equal to or greater than reference pressure P_ref at operation 204.

If it is determined at operation 204 that the sensed pressure P of the master cylinder 30 is equal to or greater than the reference pressure P_ref, the ECU 80 rotates the motor 21 of the electrically-driven booster 20 in a reverse direction to move the ball screw 22 backward at operation 205. As the ball screw 22 is moved backward, the output rod 25 pressurizing the first piston 32 of the master cylinder 30 is moved backward together, and thereby the pressure of the master cylinder 30 starts to be decreased.

At this time, the ECU 80 determines the shifted position of the input rod 24 and the shifted position of the output rod 25 at operation 206. The shifted position of the input rod 24 is determined by checking the information about the shifted position of the input rod 24 corresponding to the pedal stroke sensed by the pedal stroke sensor 60 at the storage unit 110. Also, the shifted position of the output rod 25 is determined by checking the information about the shifted position of the output rod 25 corresponding to the absolute angle of the motor sensed by the motor position sensor 90 at the storage unit 110.

Based on the determined shifted position of the input rod 24 and the determined shifted position of the output rod 25, the ECU 80 estimates the size of the isolation gap, i.e., the gap between the input rod 24 and the output rod 25 at operation 207.

After estimating the size of the isolation gap, the ECU 80 determines whether the estimated value of the isolation gap Gap is equal to or less than a predetermined reference gap Gap_ref at operation 208. If it is determined at operation 208 that the estimated value of the isolation gap Gap exceeds the predetermined reference gap Gap_ref, the process returns to operation 204 and repeats the above-described operations.

If it is determined at operation 208 that the estimated value of the isolation gap Gap is equal to or less than the predetermined reference gap Gap_ref, i.e., if there is a risk of collision between the output rod 25 and the input rod 24, the ECU 80 stops the rotation of the motor 21 of the electrically-driven booster 20, thereby stopping the backward-movement of the ball screw 22 at operation 209. Accordingly, the backward-movement of the output rod 25 toward the input rod 24 is stopped, thereby preventing a kick-back phenomenon in that a shock is transferred to the brake pedal by collision of the output rod 25 with the input rod 24. Herein, the predetermined reference gap Gap_ref means a gap having the minimum distance to avoid collision between the input rod 24 and the output rod 25.

Thereafter, if the pressure of the master cylinder 30 is decreased below the reference pressure, the ECU 80 rotates the motor 21 of the electrically-driven booster 20 in one direction to move the ball screw 22 forward. As the ball screw 22 is moved forward, the output rod 25 is moved forward together to pressurize the first piston 32 of the master cylinder 30, and thereby the pressure of the master cylinder 30 is increased.

Although it has been described above that the output rod is interposed between the ball screw of the electrically-driven booster and the piston of the master cylinder, the embodiments are not limited thereto. For example, the ball screw may move the piston of the master cylinder forward and backward by directly contacting the piston. In such a case, the isolation gap is referred to as a gap formed between the piston and the input rod.

The above-described control method of this embodiment includes determining the shifted position of the input rod 24 and the shifted position of the output rod 25 at operation 206. Although it has been described above that the isolation gap between the input rod 24 and the output rod 25 is estimated based on the shifted position of the input rod 24 determined by using the pedal stroke sensed by the pedal stroke sensor 60 and the shifted position of the output rod 25 determined by using the absolute angle of the motor sensed by the motor position sensor 90, the embodiments are not limited thereto. For example, the gap between the input rod 24 and the output rod 25 may be directly sensed by a sensing unit including a magnet and a magnetic sensor. That is, based on magnetic field variation of the magnetic sensor which is caused by the magnet mounted to the output rod 25 and the magnetic sensor mounted to the input rod 24, the gap between the input rod 24 and the output rod 25 may be measured.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An electronic brake system comprising:
   a master cylinder including a piston to generate hydraulic pressure by applying pressure to brake oil;
   an output rod configured to contact the piston;
   an input rod configured to be moved forward by a driver's manipulation of a brake pedal, and arranged coaxially to the master cylinder and spaced a predetermined isolation gap apart from the output rod contacting the piston of the master cylinder;
   an electrically-driven booster including a motor, a ball screw to move the output rod, and a motion converting unit to move the ball screw forward and backward by converting rotational movement of the motor into linear movement of the ball screw; and
   an electronic control unit to control operation of the motor based on the size of the isolation gap between the input rod and the output rod,
   wherein the electronic control unit stops backward-movement of the ball screw which is moving backward in an anti-lock brake system (ABS) mode such that the output rod does not collide with the input rod.

2. The electronic brake system according to claim 1, further comprising:
   a pressure sensor to sense pressure of the master cylinder,
   wherein if the pressure of the master cylinder sensed by the pressure sensor is greater than reference pressure in the ABS mode, the electronic control unit drives the motor to move the ball screw backward to decrease the pressure of the master cylinder.

3. The electronic brake system according to claim 1, further comprising:
   a pedal stroke sensor to sense a pedal stroke of the brake pedal; and
   a motor position sensor to sense an absolute angle of the motor,
   wherein the electronic control unit determines a shifted position of the input rod based on the pedal stroke sensed by the pedal stroke sensor, determines a shifted position of the output rod based on the absolute angle of the motor sensed by the motor position sensor, and estimates the size of the isolation gap based on the determined shifted position of the input rod and the determined shifted position of the output rod.

4. The electronic brake system according to claim 1, further comprising:
   a sensing unit to sense the size of the isolation gap,
   wherein the electronic control unit determines the size of the isolation gap through the sensing unit.

5. An electronic brake system comprising:
   a master cylinder including a piston to generate hydraulic pressure by applying pressure to brake oil;
   an input rod configured to be moved forward by a driver's manipulation of a brake pedal, and arranged coaxially to the master cylinder and spaced a predetermined isolation gap apart from the piston of the master cylinder;
   an electrically-driven booster including a motor, a ball screw to move the piston, and a motion converting unit to move the ball screw forward and backward by converting rotational movement of the motor into linear movement of the ball screw; and
   an electronic control unit to control operation of the motor based on the size of the isolation gap between the input rod and the piston,
   wherein the electronic control unit stops backward-movement of the ball screw which is moving backward in an ABS mode such that the piston does not collide with the input rod.

6. The electronic brake system according to claim 5, further comprising:
   a pedal stroke sensor to sense a pedal stroke of the brake pedal; and
   a motor position sensor to sense an absolute angle of the motor,
   wherein the electronic control unit determines a shifted position of the input rod based on the pedal stroke sensed by the pedal stroke sensor, determines a shifted position of the piston based on the absolute angle of the motor sensed by the motor position sensor, and estimates the size of the isolation gap based on the determined shifted position of the input rod and the determined shifted position of the piston.

7. The electronic brake system according to claim 5, further comprising:
   a sensing unit to sense the size of the isolation gap,
   wherein the electronic control unit determines the size of the isolation gap through the sensing unit.

8. A control method of an electronic brake system including a master cylinder including a piston to generate hydraulic pressure by applying pressure to brake oil, an output rod configured to contact the piston, an input rod configured to be moved forward by a driver's manipulation of a brake pedal and arranged coaxially to the master cylinder and spaced a predetermined isolation gap apart from the output rod contacting the piston of the master cylinder, and an electrically-driven booster including a motor, a ball screw to move the output rod, and a motion converting unit to move the ball screw forward and backward by converting rotational movement of the motor into linear movement of the ball screw, the control method comprising:

determining whether there is a need to move the ball screw of the electrically-driven booster backward in an ABS mode;

upon determining that there is a need to move the ball screw of the electrically-driven booster backward, driving the motor so that the ball screw of the electrically-driven booster is moved backward; and controlling operation of the motor based on the size of the isolation gap between the input rod and the output rod to stop backward-movement of the ball screw which is moving backward in the ABS mode before the output rod collides with the input rod.

9. The control method according to claim 8, further comprising:

sensing pressure of the master cylinder through a pressure sensor configured to sense pressure of the master cylinder in the ABS mode;

determining whether the sensed pressure of the master cylinder is greater than reference pressure; and upon determining that the sensed pressure of the master cylinder is greater than the reference pressure, driving the motor to move the ball screw backward to decrease the pressure of the master cylinder.

10. The control method according to claim 8, further comprising:

determining a shifted position of the input rod based on a pedal stroke sensed by a pedal stroke sensor configured to sense a pedal stroke of the brake pedal;

determining a shifted position of the output rod based on an absolute angle of the motor sensed by a motor position sensor configured to sense an absolute angle of the motor; and estimating the size of the isolation gap based on the determined shifted position of the input rod and the determined shifted position of the output rod.

11. The control method according to claim 8, further comprising:

determining the size of the isolation gap through a sensing unit configured to sense the size of the isolation gap.

\* \* \* \* \*